United States Patent [19]
Muslin

[11] 3,992,044
[45] Nov. 16, 1976

[54] FLEXIBLE METAL CONDUIT WITH SEALED END CONNECTORS

[75] Inventor: Bernard J. Muslin, Chicago, Ill.

[73] Assignee: Specialty Connector Corporation, Chicago, Ill.

[22] Filed: Nov. 29, 1974

[21] Appl. No.: 528,085

[52] U.S. Cl. .............................. 285/92; 174/65 R; 285/110; 285/161; 285/251
[51] Int. Cl.² .................. F16L 33/22; F16L 33/26
[58] Field of Search ............ 285/251, 247, 161, 92, 285/81, 158, 256, 90, 258, 259, 382.4, 382.5, 258, 245, 161, 110; 174/65 R, 65 SS

[56] References Cited
UNITED STATES PATENTS

| | | | |
|---|---|---|---|
| 1,266,416 | 5/1918 | Davis | 285/247 X |
| 1,954,989 | 4/1934 | Eastman | 285/256 |
| 2,444,847 | 7/1948 | Poupitch | 285/92 |
| 2,798,744 | 7/1957 | Budnick et al. | 285/161 X |
| 2,810,594 | 10/1957 | Walsh et al. | 285/251 X |
| 3,160,428 | 12/1964 | Goodall | 285/256 |
| 3,369,071 | 2/1968 | Tuisku | 174/65 R |
| 3,791,680 | 2/1974 | Cleare | 285/251 X |

FOREIGN PATENTS OR APPLICATIONS

| | | | |
|---|---|---|---|
| 651,417 | 10/1962 | Canada | 174/65 R |
| 471,439 | 5/1952 | Italy | 285/251 |
| 449,042 | 6/1936 | United Kingdom | 285/251 |
| 823 | 1/1907 | United Kingdom | 285/256 |
| 607,470 | 8/1948 | United Kingdom | 285/256 |

Primary Examiner—Thomas F. Callaghan
Attorney, Agent, or Firm—Dressler, Goldsmith, Clement, Gordon & Shore, Ltd.

[57] ABSTRACT

A connector assembly for attachment to the end of a compressible plastic covered conduit having a spiralling groove on the inside thereof, the connector assembly including an air impervious cylindrical sleeve member enveloping the compressible plastic covering and terminating at its outer end in a continuous annular inwardly and axially outwardly extending resilient seal-forming lip. A coupling member is provided having a sleeve portion with an external threading which snugly interfits with the spiralling groove on the inside of said conduit, thereby to expand the conduit outwardly to compress said compressible plastic conduit covering up against the inner surface of said sleeve member to form a liquid and airtight seal thereat. The coupling member has a flange which is axially held in a liquid and airtight sealing relationship with the continuous annular lip of the sleeve member. The coupling member is locked in place within the conduit by an outwardly extending projection struck from the body of said sleeve portion thereof and projecting against the conduit at a point spaced from the spiralling groove.

8 Claims, 4 Drawing Figures

FLEXIBLE METAL CONDUIT WITH SEALED END CONNECTORS

BACKGROUND OF INVENTION

Flexible metal conduits containing electrical wiring and end connectors sealed around the ends of the conduits are provided between electrical devices and junction boxes in environments where the electrical code requires sealed connections to prevent electrical sparks from gaining access to flammable materials through spaces left by an improper fitting or connection between the end connectors and the ends of the metal conduits which they envelope. The end connectors commonly are adapted to extend through openings in the housings of the electrical devices and junction boxes and receive nuts and sealing gaskets or the like which sealingly anchor the same to the housings.

One of the most important applications for such a flexible metal conduit with sealed end connectors is for lighting fixtures mounted in drop-ceilings forming a plenum in forced air heating systems. In such environments, code requirements are particularly severe with regard to isolating the electrical system from the air in the return plenum. In such case, while it would be desirable for the lighting fixture manufacturers to sell their fixtures with the attached metal conduit and sealed end connectors ready to be connected to junction boxes, because of the difficulty heretofore encountered in providing properly sealed pre-assembled end connectors for the conduits, the electrical contractors generally are given the responsibility of assembling the conduit and end connectors at the situs of the fixture installation. These end connectors, which usually included sealing rings and threaded connectors, are relatively expensive to install, and require special test procedures to determine if they provide effective seals. Moreover, it is desirable to prevent shock or arcing hazards which can be caused by inadequate or intermittent grounding of the conduit through the connectors due, for example, to vibrations applied to loosely mounted connectors. Also, using the connector constructions of the prior art it is often difficult to determine when the connectors are in the most ideal position on the conduit.

The conduit and connector assembly disclosed in my copending application Ser. No. 339,633, filed Mar. 18, 1974 and now U.S. Pat. No. 3,895,177, and that of the present invention comprise only a few parts, are easy to assemble into their ideal interfitting conditions, and they can be inexpensively and reliably fabricated in a factory so they require no testing or special assembly procedures at the situs of the fixture installation to ensure the proper sealing thereof. Thus, they can be mounted on the lighting fixtures by the fixture manufacturers in their manufacturing plants, so only their connection to junction boxes is required at the fixture installation.

In the conduit and connector assembly disclosed in said application Ser. No. 339,633, the conduit is a flexible open-ended spiral grooved metal conduit coated with a synthetic rubber-like plastic material which is air impervious, compressible and resilient. A connector assembly is provided at each end of the metal conduit which includes a coupling member with an air impervious metal sleeve portion enveloping the compressible resilient material at the adjacent end of the conduit, the metal sleeve portion having at least one and preferably three inwardly projecting continuous annular ribs pressed into the compressible resilient material without penetrating the same, to form at least one and preferably three continuous airtight seals between the sleeve portion of each connector and the compressible resilient material. Each coupling member has an outer flanged head portion which forms a wiring passageway communicating with the conduit interior and which is adapted to be anchored and sealed to the margins of a wall opening in the housing of an electrical device or junction box. Electrical connection between each coupling member and the conduit, which is generally required so the conduit may be suitably grounded, is provided by a resilient contact-forming member having a hollow longitudinally split shank and flank portions friction fitted within the adjacent open end of the conduit as by compressing the same slightly in the process of inserting the same into the conduit. The flange portion is in contacting relation between an axially inwardly facing shoulder formed on the head portion of the connector involved and the outer edge of the conduit, so it has a definite pre-determined position in the assembly.

The aforementioned annular ribs extending from the sleeve portion of the coupling member described above, as a practical matter, must be formed by crimping the sleeve portion of the member by a suitable rotating punch and die apparatus as disclosed in the aforesaid application. The sleeve portion must in this case be made of a material like aluminum which needs no protective coating. Thus, a connector made of a galvanized metal could not be used in this invention because the crimping operation grounds off the protective coating. Also, the grooving is aesthetically unpleasing and there is a small risk that the annular ribs formed by the crimping operation will severe the compressible resilient material or will not extend far enough into the compressible material to form a good seal.

The present invention provides a conduit and connector assembly having all of the advantages of the connector assembly disclosed and claimed in the aforesaid application without the use of an externally pinched or grooved sleeve which has the disadvantages referred to.

It is, accordingly, one of the objects of the present invention to provide a sealed conduit and connector assembly usable with a conduit of the type which has a spiral grooved construction and is coated with a seal-forming compressible resilient material, wherein the connectors which are sealed to the ends thereof comprise a few parts which may be simply, economically and permanently securely applied to the conduit at the factory and without the necessity for utilizing nuts, or externally grooved connector sleeves as in the case of the connectors disclosed in the aforesaid application.

SUMMARY OF THE INVENTION

In accordance with one of the features of the invention, instead of providing a coupling member which is crimped over the conduit covering and a split sleeve member for grounding the conduit, the connector assembly of the present invention provides an externally threaded sleeve portion on the coupling member which makes a snug interfitting engagement with the spiral grooving on the inside of the conduit, so that threading the sleeve portion within the conduit will expand the conduit somewhat. A seal is formed on the end of the conduit by providing a sleeve member which envelopes the plastic covering at the end of the conduit, so that when the conduit is expanded by threading of the coupling member into the conduit, the covering is pushed against the sleeve member to form a liquid and airtight seal thereat. The coupling member is fully threaded into the conduit so that the flanged head portion thereof bears preferably against the end of the sleeve member to form a seal thereat.

The sealing contact between the flange of the coupling member and the end of the sleeve member is most advantageously achieved, in accordance with a specific aspect of the invention, by providing on the sleeve member a continuous annular inwardly and axially outwardly extending lip against which the flange of the coupling member is sealingly pressed when the coupling member is fully threaded into the conduit. The continuous annular lip of the sleeve member is, in the most preferred form of the invention, sandwiched between the flange of the coupling member and the end of the conduit, which is most advantageously severed in the factory by cutting apparatus which precisely cuts the end of the conduit on a plane transverse to the longitudinal axis thereof, which is not readily possible when a conduit is severed at the situs by the usual tools used for this purpose.

In accordance with another feature of the invention, the connector assembly is locked in its ideal position within the end of the conduit by tongues or barbs struck outwardly from the sleeve portion of the coupling member so as to penetrate or frictionally engage the inner wall surfaces of the conduit at points spaced from the groove therein. The latter result is assured independently of the particular point at which the conduit is severed in the process of assembly by striking the tongues or barbs from the sleeve portion of the coupling member so that the spacing of the tongues is such that if one of the tongues is positioned opposite the groove in the conduit the one or more other tongues will be spaced from such a groove to insure a locking fit with the conduit. Thus, the present invention achieves a firm locking of the connector assembly on the conduit end without the need for crimping the exterior surface of the assembly or the need for nuts and the like which can readily become loosened under the force of vibrations or other forces applied thereto.

U.S. Pat. No. 2,821,567 to Bergan discloses a liquid-type conduit connector resembling in only some respects the connector assembly of the present invention in that it discloses a coupling member with a flange and an internal sleeve which extends into the conduit and expands the compressible covering thereof outward against an external sleeve. However, the internal sleeve is unthreaded and sharply tapered, and the external sleeve is an integral extension of the coupling member body and is externally threaded to receive securing nuts to lock the assembly in an airtight sealed condition. Such a connector assembly is not equivalent to the present invention since the one-piece construction described is relatively difficult to apply to the conduit, the use of nuts which can become loosened renders the same potentially unreliable, and the tapered design of the internal sleeve makes the position of the coupling member relative to the conduit a function of the precise dimensions of the parts and the force used by the installer in pushing the coupling member within the conduit so the operator does not know when he has an optimally sealed assembly as in the case of the present invention where the parts have a pre-determined relationship for optimum sealing action.

The above and other advantages and features of the invention will become apparent upon making reference to the specification to follow, the claims and the drawings.

EXEMPLARY EMBODIMENT OF THE INVENTION

Figure 1:
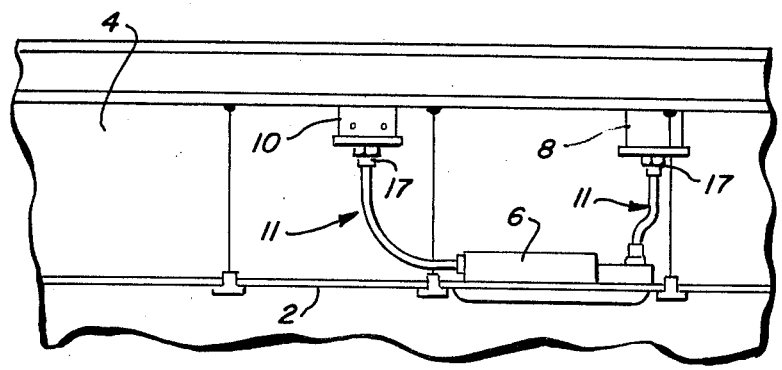
FIG. 1 is a sectional view through a drop ceiling showing a lighting fixture and junction boxes mounted within a plenum formed in part by the drop ceiling, and wherein the lighting fixture is connected to a junction box by flexible metal conduits with end connector assemblies, constituting the present invention.

Referring now more particularly to FIG. 1, shown therein is a drop ceiling 2 defining a plenum space 4 in which air can be circulated in a heating or air conditioning system. A lighting fixture 6 is shown mounted in the drop ceiling 2, and connected to junction boxes 8 and 10 by metal conduit and connector assemblies 11—11. In a manner to be described, the metal conduit and connector assemblies 11—11 are constructed in such a way that the interior of the metal conduits are isolated from the air in the plenum space 4, so that any sparks which may develop within the electrical portion of the system illustrated cannot gain access to the plenum space 4.

Figure 2:
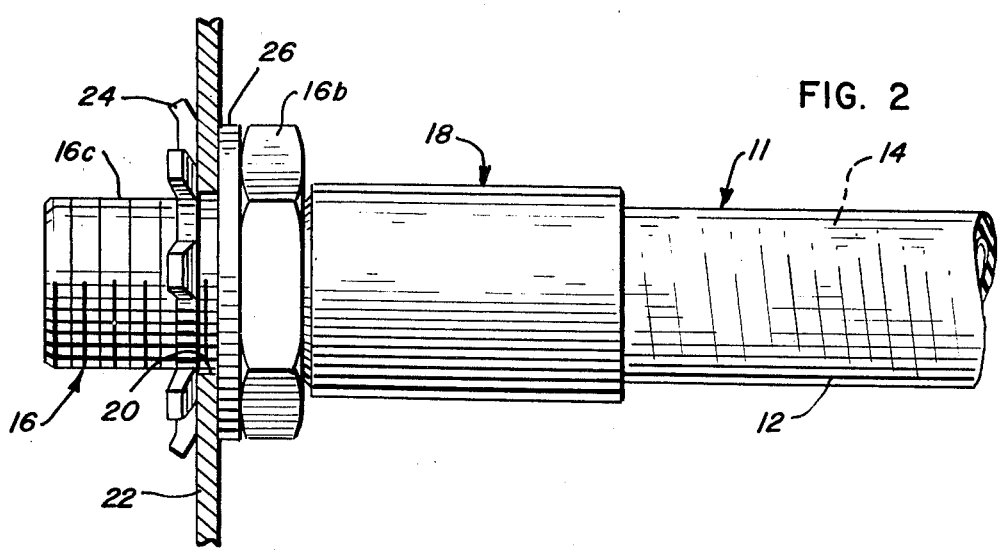
FIG. 2 is a greatly enlarged fragmentary side elevational view of one end of one of the conduits and attached end connector assembly shown in FIG. 1.
Figure 3:
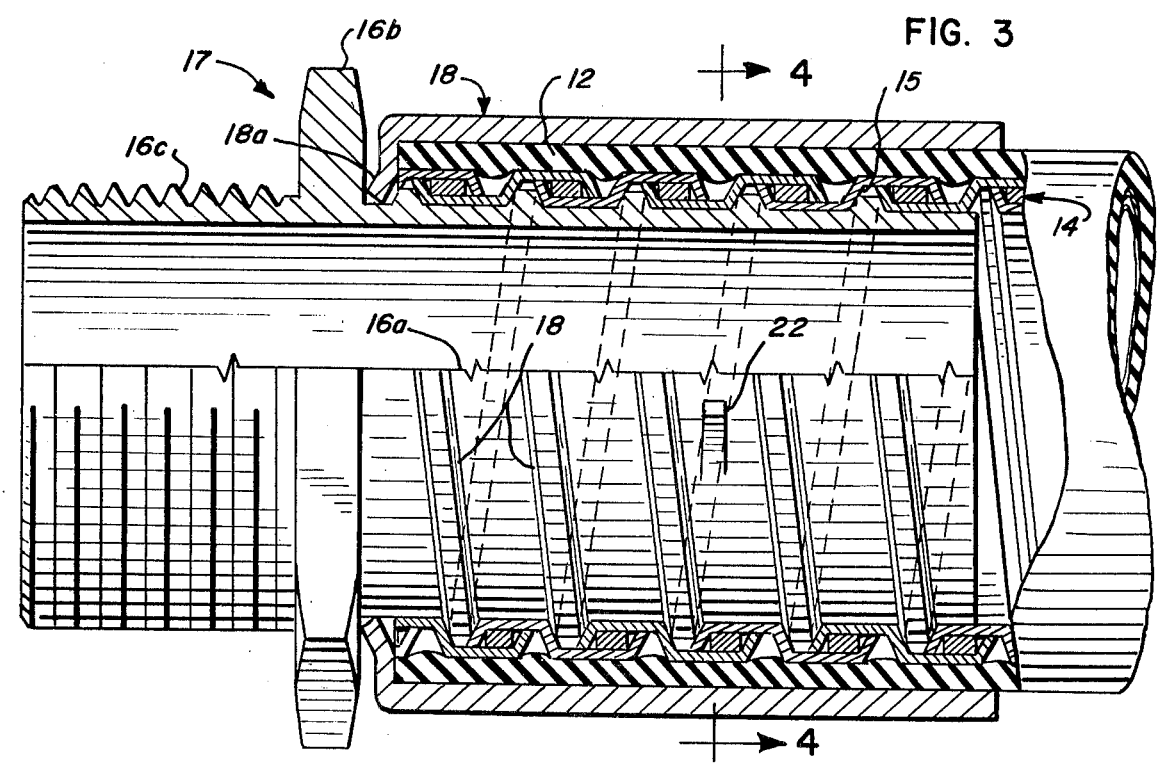
FIG. 3 is a partial sectional view through the portion of the conduit and attached end connector assembly shown in FIG. 2.
Figure 4:
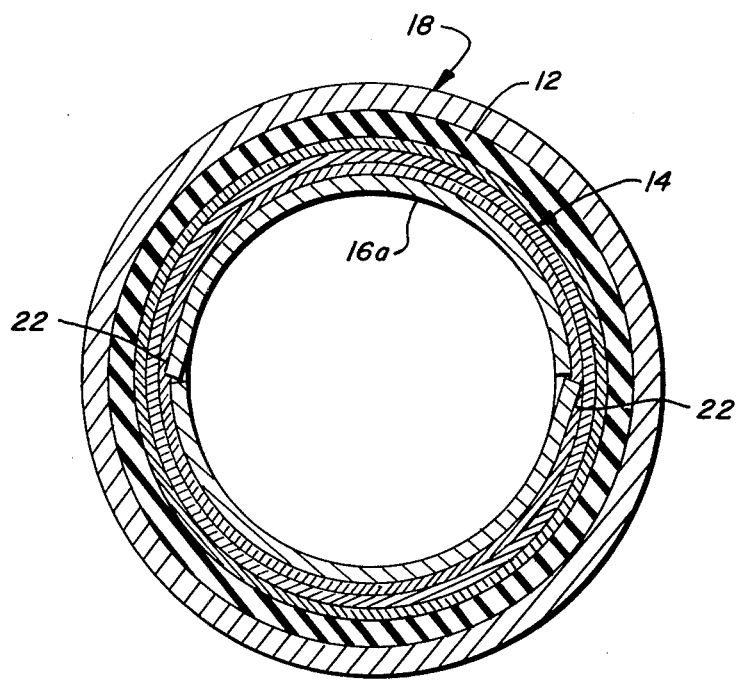
FIG. 4 is an enlarged transverse sectional view through the assembly of FIG. 3, taken along section line 4—4 in FIG. 3.

Refer now to FIGS. 2–4 which illustrate in more detail than FIG. 1 the construction of the conduit and end connector assemblies 11—11. As thereshown, each conduit and end connector assembly 11 includes a flexible conduit 14, commonly referred to as BX conduit, having longitudinally spiralling grooving 15 on the inside and outside thereof and a covering 12 of an air impervious synthetic plastic rubber-like material, such as polyvinyl chloride, which forms an air impervious resilient compressible airtight covering over the metal conduit 14.

A connector assembly 17 is secured to each end of the conduit 14, each connector assembly most advantageously comprising a metal coupling member 16 which threads into one end of the conduit 14 and a cylindrical metal sleeve member 18 enveloping the plastic covering 12 thereat.

The coupling member 16 has a sleeve portion 16a having externally projecting threads 18 adapted to make a tight or snug fit with the spiral grooving 15 on the inside of the conduit 14. Accordingly, when the coupling member 16 is threaded into the conduit 14, the conduit will expand somewhat. The coupling member further has a flanged head portion including a flange 16b projecting outwardly from a point adjacent to the sleeve portion 16a and a reduced externally threaded neck 16c projecting axially from the outer side of the flange 16b.

Before the coupling member is mounted within the conduit 14, the sleeve member 18 is applied to the plastic covering 12 of the conduit. The internal diameter of the sleeve member 18 is such as to make a sliding fit with the covering 12 before the coupling member is applied to the conduit 14. Accordingly, when the coupling member is secured in place within the conduit, the resulting expansion of the conduit will force the plastic cover 12 into an airtight sealing relationship with the inside of the sleeve member.

To isolate the interior of the conduit 14 from the surrounding atmosphere, in addition to the seal formed between the plastic covering 12 and the inside surface of the sleeve member 18, there must be a seal formed between the flange portion 16b of the coupling member and the outer end portion of the conduit or the outer end portion of the sleeve member 18. In the preferred form of the present invention, this seal is formed between the flange portion 16b of the coupling member and the outer face of a continuous annular lip 18a formed on the outer end of the sleeve member 18. The continuous annular lip 18a extends inwardly from the end of the sleeve member and is inclined in a direction axially outwardly thereof. The sleeve member 18 is formed of a suitable metal like aluminum so the continuous annular lip 18a is resilient.

The conduit 14 and associated plastic covering 12 is preferably severed at the factory into an appropriate length so the severance plane at each of the conduit is at right angles to the longitudinal axis of the conduit. When the sleeve member 18 is initially applied over the conduit, it is positioned fully thereover so the severed end of the conduit and associated plastic covering 12 is preferably in engagement with the inner surface of the continuous annular lip 18a, although this is not necessary to effect the necessary seal between the plastic covering and the coupling member 18.

In the process of mounting the coupling member 16 within the conduit 14 after application of the sleeve member 18 thereto, the coupling member is threaded to its fullest extent within the conduit 14 so the flange portion 16b presses against the outwardly axially inclined annular lip 18a to form an airtight seal therewith.

Following the application of the sleeve member 18 and the coupling member 16 to an end of the conduit 14, using any one of a number of commercially available tube punching devices two or more tongues or barbs 22—22 are punched outwardly from the sleeve portion 16a of the coupling member 16. In the exemplary form of the invention illustrated, the tongues 22—22 are formed in the same plane transverse to the longitudinal axis of the conduit 14 to insure that at least one of the tongues will be formed at a point spaced from the spiral grooving 15. A tongue punched outwardly from the sleeve portion 16a of the metal coupling member 16 will, either by penetration of the conduit 14 or its tight frictional contact with the inner surface of the conduit, particularly at a point spaced from the grooving 15, secure the coupling member 16 against rotation within the conduit 14 under any of the normal forces applied to the coupling member 16 by vibrational or other forces. Thus, the connector assembly 17 is tightly anchored to the end of the conduit 14 without the need for nuts or without the need of any external crimping operations. Thus, the outer suface of the coupling member 18 may be a smooth surface, as illustrated.

The connector assembly 17 at each end of the conduit 14 is designed to effect a sealed anchoring connection within an opening 20 in a wall 22 of the housing of a junction box, electrical device or the like with which the combined conduit and connector assembly 11 is to be utilized. The flange portion 16b of the coupling member 16 is shown on the outside of the wall 22 of the housing. The externally threaded neck 16c of the coupling member extends through the opening 32 and receives a lock nut 24 or the like which bears against the inner surface of the housing wall 22. A sealing ring 26 is preferably utilized to form an airtight seal at the point where the threaded neck 16c of the connector 18 passes into the opening 20. The connector assembly 17 at the other end of each conduit and end connector assembly 11 is constructed and mounted in the manner shown in FIG. 3.

The aforementioned manner in which the connector assemblies 17 are sealed around the plastic covered conduit 14 provides a very reliable and inexpensive way to manufacture preassembled conduit and end connector assemblies which can be sold to lighting fixture and other manufacturers, and to electrical contractors.

It should be understood that numerous modifications may be made in the most preferred form of the invention described without deviating from the broader aspects thereof.

I claim:

1. An electrical conduit and connector assemblage comprising a spirally wound continuous metal conduit defining on the inside thereof a longitudinally spiralling groove, said conduit having at least at the ends thereof a thin covering of an air-impervious resilient material, an air and liquid tight two piece connector assembly secured to each end of said conduit, each of said connector assemblies comprising: a first air-impervious, generally cylindrical sleeve member enveloping the covering material at the associated end of the conduit, said sleeve member terminating at the outer end of the conduit in a continuous annular inwardly extending resilient lip confronting and engaging an end portion of said conduit, and a second coupling member including a generally cylindrical sleeve portion having integral external threading which projects outwardly from the said sleeve portion and which snugly interfits within the spiralling groove on the inside of said conduit, said coupling member including a flange integral with said sleeve portion and extending radially outwardly therefrom, said flange confronting said lip, said sleeve member and said sleeve portion coacting to compress said covering material therebetween to define at least an annular zone which forms a liquid and airtight seal thereby to prevent the passage of air and liquid between said sleeve member and said covering material into the region between said sleeve portion and the inside of said conduit, said lip and said flange providing a seal between them to prevent the passage of air and liquid from outwardly of said connector assembly into the region between said sleeve portion and said conduit, said coupling member being locked in place within the adjacent end of said conduit and against ready removal therefrom by a projection in addition to said threading extending outwardly from the sleeve portion and projecting into engagement with said conduit at a location axially spaced from the terminal end of said conduit, and said coupling member having on the side of such flange opposite the side facing said sleeve member an axially extending open ended anchoring member-receiving portion of smaller extent than said flange for engaging with an anchoring member which holds the coupling member in place within an opening in a wall or the like.

2. The combination of claim 1 wherein said projection comprises an outwardly extending projection struck from the body of said sleeve portion thereof and projecting against said conduit at a point spaced from said spiralling groove.

3. The combination of claim 1 wherein each sleeve member has a smooth outer cylindrical surface.

4. The combination of claim 1 wherein said open ended anchoring member-receiving portion of said coupling member is externally threaded to receive thereover a securing nut.

5. The combination of claim 1 in which said lip is resilient and extends both annularly inwardly and axially forwardly of said sleeve member.

6. The combination of claim 5 in which the lip and the flange sealingly engage each other.

7. The combination of claim 1 wherein said external threading snugly fits within the spiralling groove on the inside of said conduit to expand the conduit outwardly, thereby to compress said resilient material covering the conduit end against the inner surface of said sleeve member, thereby to provide said annular zone which forms a liquid and airtight seal.

8. An electrical conduit and connector assemblage comprising a spirally wound continuous metal conduit defining on the inside thereof a longitudinally spiralling groove, said conduit having at least at the ends thereof a thin covering of an air-impervious compressible resilient material, an air and liquid tight two piece connector assembly secured to each end of said conduit, each of said connector assemblies comprising: a first air-impervious, generally cylindrical sleeve member enveloping the compressible resilient covering material at the associated end of the conduit, said sleeve member terminating at the outer end of the conduit in a continuous annular seal forming lip, said lip having a first annular inwardly extending portion confronting and engaging an end portion of said conduit and a second inwardly and axially forwardly extending resilient portion which is at an acute angle to the axis of said cylindrical sleeve, and a second coupling member including a generally cylindrical sleeve portion having integral external threading which projects outwardly from the said sleeve portion and which snugly interfits within the spiralling groove on the inside of said conduit, thereby to expand the conduit outwardly to compress said compressible resilient material covering the conduit end against the inner surface of said sleeve member to form a liquid and airtight seal thereat, said coupling member including an annular flange which confronts said second lip portion and which is axially held in a liquid and airtight sealing relationship with said second continuous annular lip portion of said sleeve member and which is integral with said sleeve portion and which extends radially outwardly therefrom, said sleeve member and said sleeve portion coacting to compress said covering material therebetween to define at least an annular zone which forms said liquid and airtight seal thereby to prevent the passage of air and liquid between said sleeve member and said covering material into the region between said sleeve portion and the inside of said conduit, said second resilient lip portion and said annular flange providing a seal between them to prevent the passage of air and liquid from outwardly of said connector assembly into the region between said sleeve portion and said conduit, and said coupling member having on the side of such flange opposite the side facing said sleeve member an axially extending open ended anchoring member-receiving portion of smaller extent than said flange for engaging with an anchoring member which holds the coupling member in place within an opening in a wall or the like.

* * * * *